(12) United States Patent
Parra et al.

(10) Patent No.: US 10,578,824 B2
(45) Date of Patent: Mar. 3, 2020

(54) FIBER CLIP AND METHOD OF USE

(71) Applicant: CommScope Technologies LLC, Hickory, NC (US)

(72) Inventors: Celso Jaime Parra, Juarez (MX); Alejandro Vargas Portillo, Juarez (MX); Brent Gregory Wiehle, Maple Grove, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/791,704

(22) Filed: Oct. 24, 2017

(65) Prior Publication Data

US 2018/0113269 A1    Apr. 26, 2018

Related U.S. Application Data

(60) Provisional application No. 62/412,640, filed on Oct. 25, 2016.

(51) Int. Cl.
*G02B 6/44* (2006.01)

(52) U.S. Cl.
CPC ................. *G02B 6/4471* (2013.01)

(58) Field of Classification Search
CPC .... G02B 6/4452; G02B 6/445; G02B 6/4453; G02B 6/4455
See application file for complete search history.

(56) References Cited

U.S. PATENT DOCUMENTS

| | | | | |
|---|---|---|---|---|
| 5,590,234 A | * | 12/1996 | Pulido | G02B 6/4442 385/134 |
| 2003/0108321 A1 | * | 6/2003 | Krampotich | G02B 6/4471 385/134 |
| 2007/0047891 A1 | * | 3/2007 | Bayazit | G02B 6/4471 385/135 |
| 2011/0182558 A1 | * | 7/2011 | Garcia | G02B 6/4471 385/135 |
| 2018/0180825 A1 | | 6/2018 | Sorenson | |

* cited by examiner

*Primary Examiner* — Sung H Pak
*Assistant Examiner* — Hoang Q Tran
(74) *Attorney, Agent, or Firm* — Merchant & Gould P.C.

(57) ABSTRACT

An optical fiber retaining clip includes a main body that includes a top face and a bottom face. The optical fiber retaining clip includes at least one projection that protrudes from the top face and a tab portion positioned at the top face. The tab portion is configured to hold a plurality of optical fibers to prevent relative movement between the plurality of optical fibers and the main body of the clip.

18 Claims, 21 Drawing Sheets

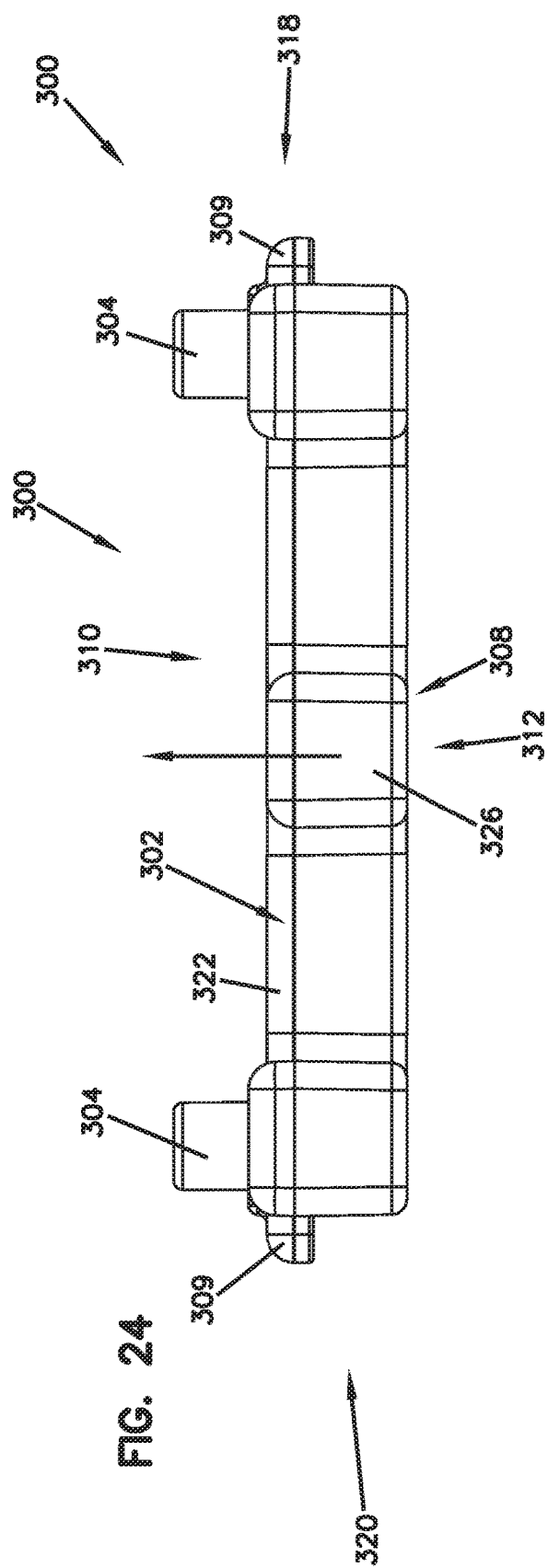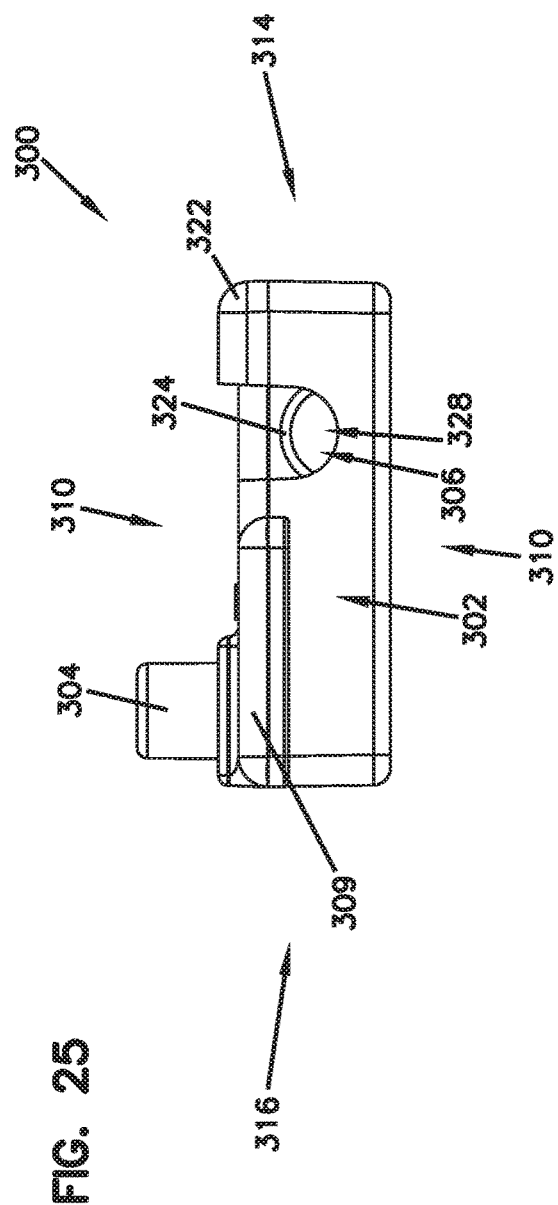

FIBER CLIP AND METHOD OF USE

CROSS-REFERENCE TO RELATED APPLICATION

This application claims the benefit of U.S. Patent Application Ser. No. 62/412,640, filed on Oct. 25, 2016, the disclosure of which is incorporated herein by reference in its entirety.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected and disconnected.

A typical fiber optic connector includes a ferrule assembly supported at a front end of a connector housing. The ferrule functions to support an end portion of at least one optical fiber (in the case of a multi-fiber ferrule, the ends of multiple fibers are supported). The ferrule has a front end face at which a polished end of the optical fiber is located. A fiber optic connector is often secured to the end of a corresponding fiber optic cable. Connectors are typically installed on fiber optic cables in the factory through a direct termination process. In a direct termination process, the connector is installed on the fiber optic cable by securing an end portion of an optical fiber of the fiber optic cable within a ferrule of the connector. After the end portion of the optical fiber has been secured within the ferrule, the end face of the ferrule and the end face of the optical fiber are polished and otherwise processed to provide an acceptable optical interface at the end of the optical fiber.

Optical fibers can be housed in large cables, often referred to as distribution cables. Such cables can contain multiple optical fibers (i.e., 12, 24, 36, etc.). To connectorize each optical fiber within the distribution cable, the optical fibers must be fanned out (i.e., separated) from the distribution cable and each individually connectorized. However, during this process, organizing and managing each optical fiber and connector can be difficult and cumbersome. This problem is increased when multiple distribution cables are being fanned out and connectorized in the same area. Therefore improvements in managing the optical fibers are needed.

SUMMARY

The present disclosure relates generally to optical fiber cable management. In one possible configuration, and by non-limiting example, a clip including a tab that is configured to organizing a group of optical fiber cables is disclosed.

In one aspect of the present disclosure, an optical fiber retaining clip is disclosed. The optical fiber retaining clip includes a main body that includes a top face and a bottom face. The optical fiber retaining clip includes at least one projection that protrudes from the top face or the bottom face and a tab portion positioned at the top face. In one embodiment the tab portion is flexible. The tab portion is configured to hold a plurality of optical fibers to prevent relative movement between the plurality of optical fibers and the main body of the clip.

In another aspect of the present disclosure, an optical fiber clipping system is disclosed. The optical fiber clipping system includes a first clip that includes a tab portion for retaining a plurality of optical fibers. The first clip also includes at least one projection. The optical fiber clipping system includes a second clip that includes a tab for retaining a plurality of optical fibers. The second clip includes a recess portion for receiving the at least one projection from the first clip. The tab portions may be flexible.

In another aspect of the present disclosure, a method of organizing a plurality of optical fiber cables is disclosed. The method includes pivoting a tab of a main body of a clip in a direction away from the main body. The method includes positioning the plurality of optical fiber cables under the tab and on a top surface of the main body of the clip. The method includes releasing the tab of the main body of the clip.

In a further aspect, the main body includes a central projection disposed between two arms. Each of the arms and the projection include a channel section for receiving cables. The channel sections of the arms face in an opposite direction to the channel section of the central projection.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 24 illustrates a front view of the optical fiber retaining clip of FIG. 20;

FIG. 25 illustrates a right side view of the optical fiber retaining clip of FIG. 20;

DETAILED DESCRIPTION

Figure 1:
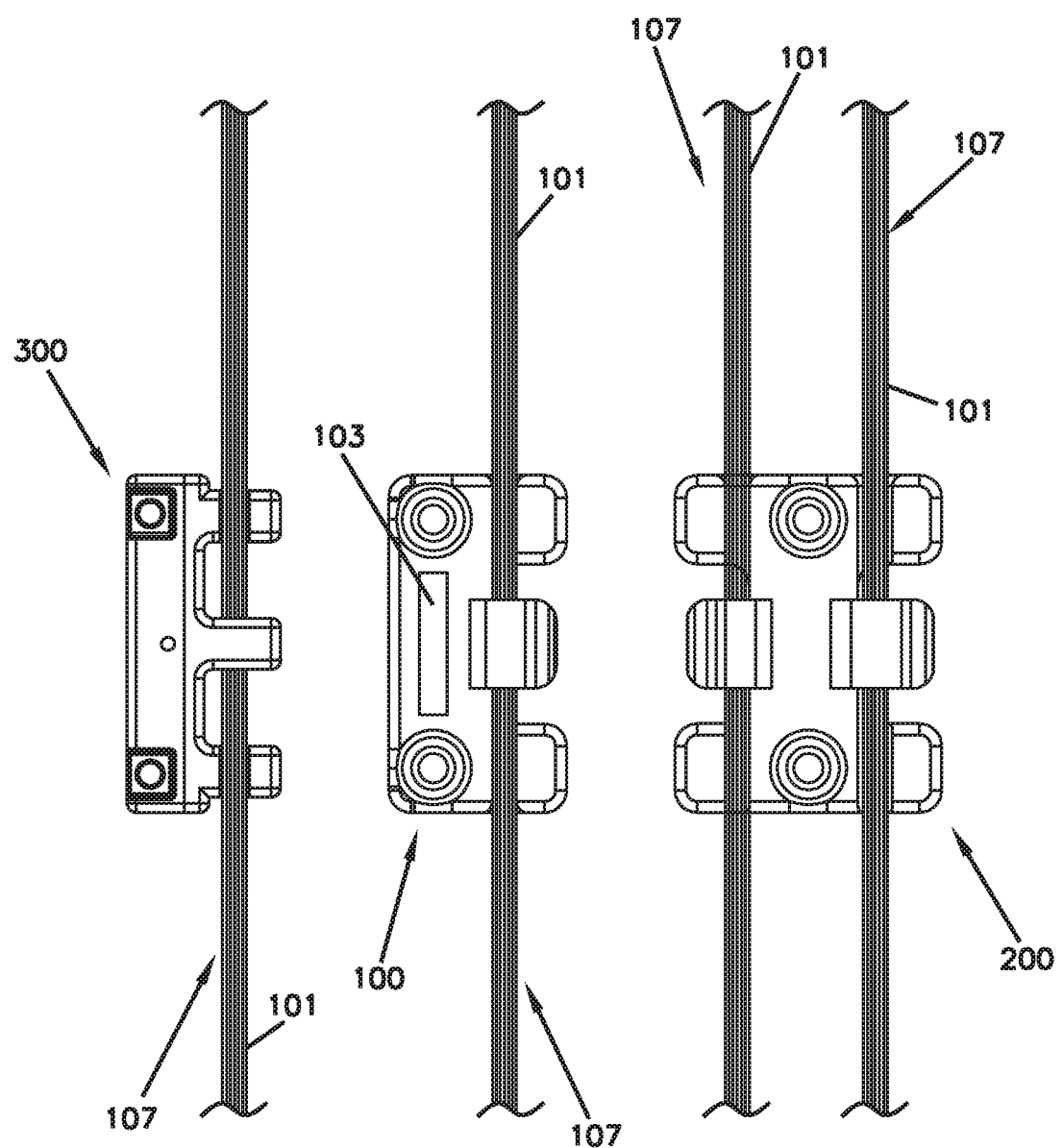
FIG. 1 illustrates a perspective view of a plurality of optical fiber retaining clips according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The clip disclosed herein has several advantages. The clip is configured to clip to, and help to manage, a plurality of optical fiber cables after a distribution cable is fanned out. Further, each clip is configured to be secured to other similar clips so that optical fibers from multiple distribution cables can be organized and kept in the same area. Further, each clip is reusable. The clip helps to improve efficiency and helps to reduce costs of disposable organizational methods (e.g., tape).

FIG. 1 shows a perspective view of a plurality of clips 100, 200, 300 secured to optical fiber cables 101. The cables 101 are separated into groups 107 by the each clip 100. Each group 107 can contain a plurality of cables 101. In some embodiments, each group 107 contains about 12, about 16, about 24, etc. optical fiber cables 101. Each clip 100, 200, 300 is secured to the cable groups 107 in a fixed manner so as prevent relative movement between the each cable group 107 and each clip 100, 200, 300. Further, each clip 100, 200, 300 does not damage any of the optical fiber cables 101.

To aid in organization, each clip 100 can include a label 103. The label 103 can help identify each cable group so as to aid the user. In some embodiments, the clips 100 can be attached to one another or to other structures to improve organization.

Figure 2:
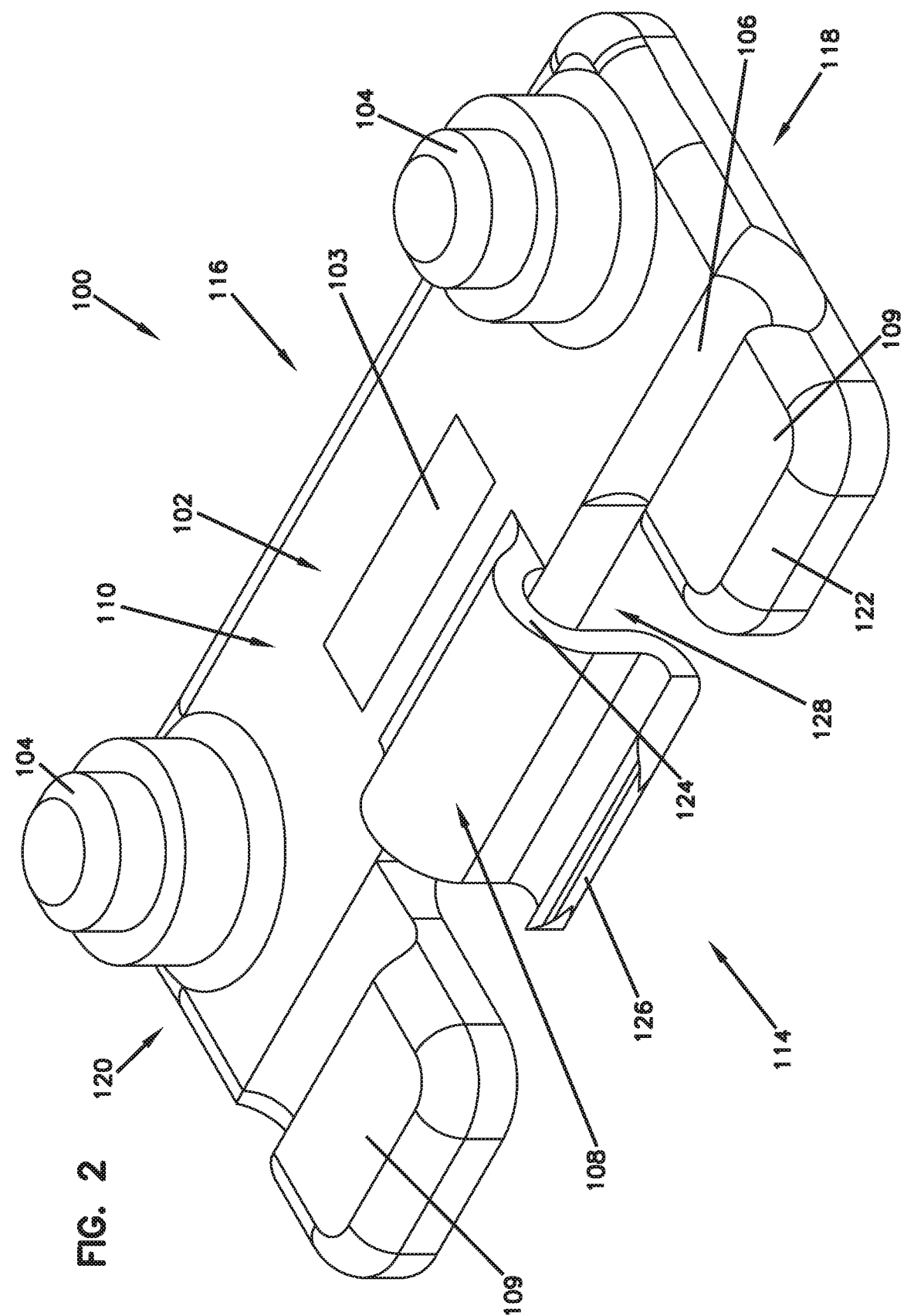
FIG. 2 illustrates a top perspective view a single optical fiber retaining clip, according to one embodiment of the present disclosure

FIGS. 2-7 show the clip 100 from a variety of different views. FIG. 2 shows a perspective view of the clip 100. The clip 100 includes a main body 102, a pair of projections 104, a fiber channel 106, and a flexible tab 108. The clip 100 is configured to be secured to the plurality of optical fiber cables 101. In some embodiments, the tab 108 is rigid and not flexible.

Figure 4:
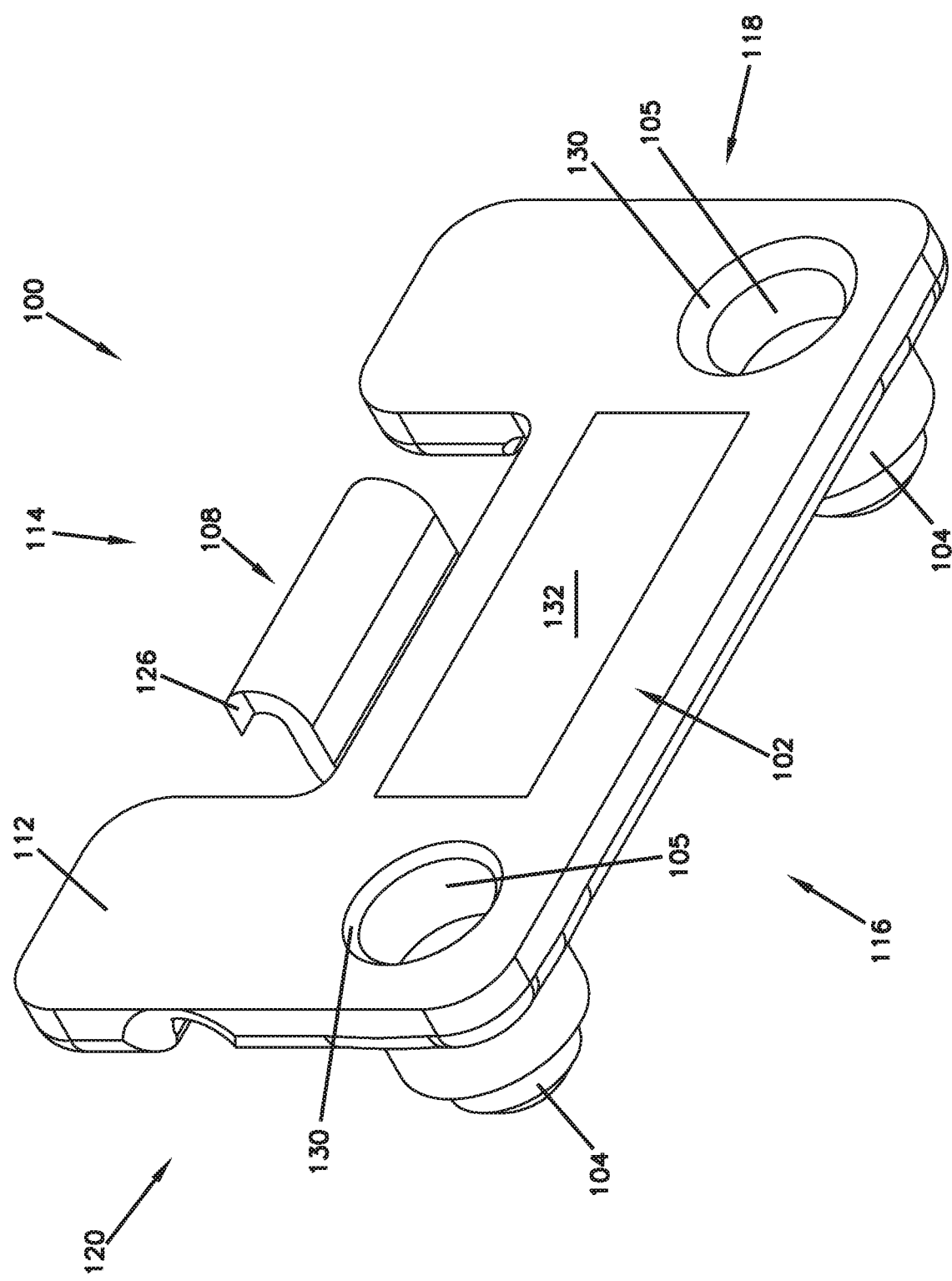
FIG. 4 illustrates a bottom perspective view of the optical fiber retaining clip of FIG. 2.

The main body 102 includes a top 110, bottom, 112, front 114, back 116, left 118, and right 120. In some embodiments, the main body 102 includes a rounded outer edge 122 on at the top 110 so as to help reduce accidental abrasion to any optical fiber cables that come into contact with the clip 100. The main body 102 can be constructed of a variety of materials such as ABS plastic, PVC plastic, or other similar materials. In some embodiments, the main body 102 includes a pair of arms 109 extending therefrom The projections 104 extend away from the top 110 of the main body 102. The projections 104 allow the clip 100 to be secured to other similar clips (shown in FIGS. 8-10). The projections 104 are configured to be received by recesses 105 (as shown in FIG. 4) of other clips 100. In some embodiments, the projections 104 utilize an interference fit with the recesses 105 so as to be retained within the recesses 105. In the depicted embodiment, the projections 104 each have a stepped configuration. In other embodiments, the projections 104 can have a variety of different shapes and sizes. Further, the amount of projections 104 that are disposed on the main body 102 can vary. In some embodiments, a single projection 104 can extend from the main body 102. In other embodiments, the clip 100 can include more than two projections 104.

The fiber channel 106 is recessed into the top 110 of the main body 102 and travels generally from the left side 118 to the right side 120 of the main body 102. The fiber channel 106 is configured to receive and hold the plurality of optical fiber cables 101. The channel 106 can be sized to hold a varied number of optical fiber cables. In some embodiments, the channel 106 can hold about twelve optical fiber cables.

The flexible tab 108 is disposed on the top 110 of the main body 102. In some embodiments, the flexible tab 108 extends away and out from the main body 102. The flexible tab 108 is configured to retain the clip 100 on the plurality of optical fiber cables 101 so that the clip 100 and cables 101 do not slide relative to each other. In some embodiments, the flexible tab 108 can be adjustable and sized differently so as to accommodate a large range of optical fiber cables.

The flexible tab 108 includes an arced portion 124 and lever arm 126. The arced portion 124 defines a passage 128 that aligns with the fiber channel 106. The passage 128 is configured to be sized so as to exert a small amount of compression force on optical fiber cables positioned within the passage 128.

Figure 3:
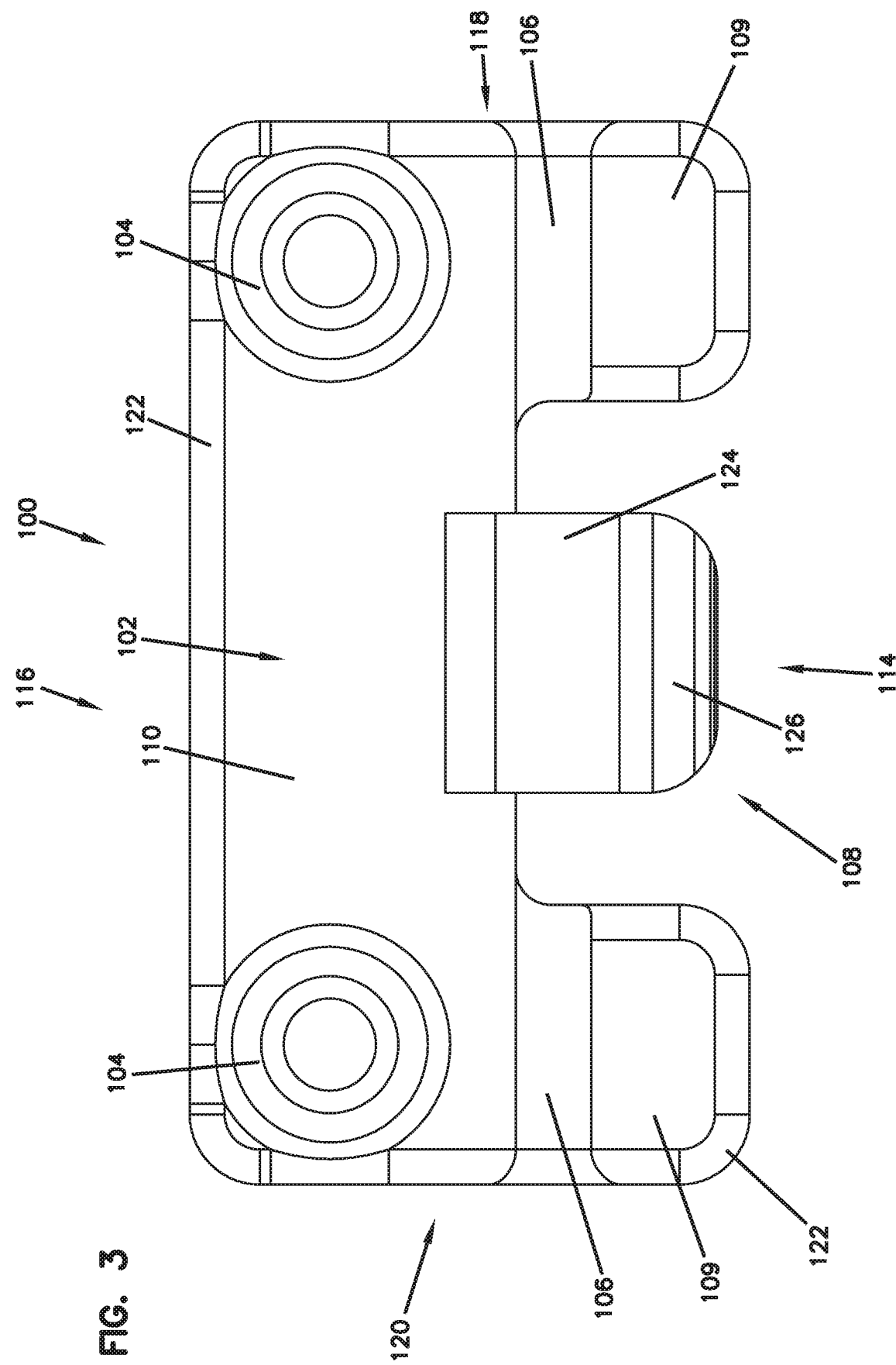
FIG. 3 illustrates a top view of the optical fiber retaining clip of FIG. 2.

FIG. 3 shows a top view of the clip 100. Note that the clip 100 is generally rectangular shaped; however, in other embodiments, the clip 100 can be a variety of different shapes. As shown, the channel 106 is aligned with the arced portion 124 of the flexible tab 108.

Figure 5:
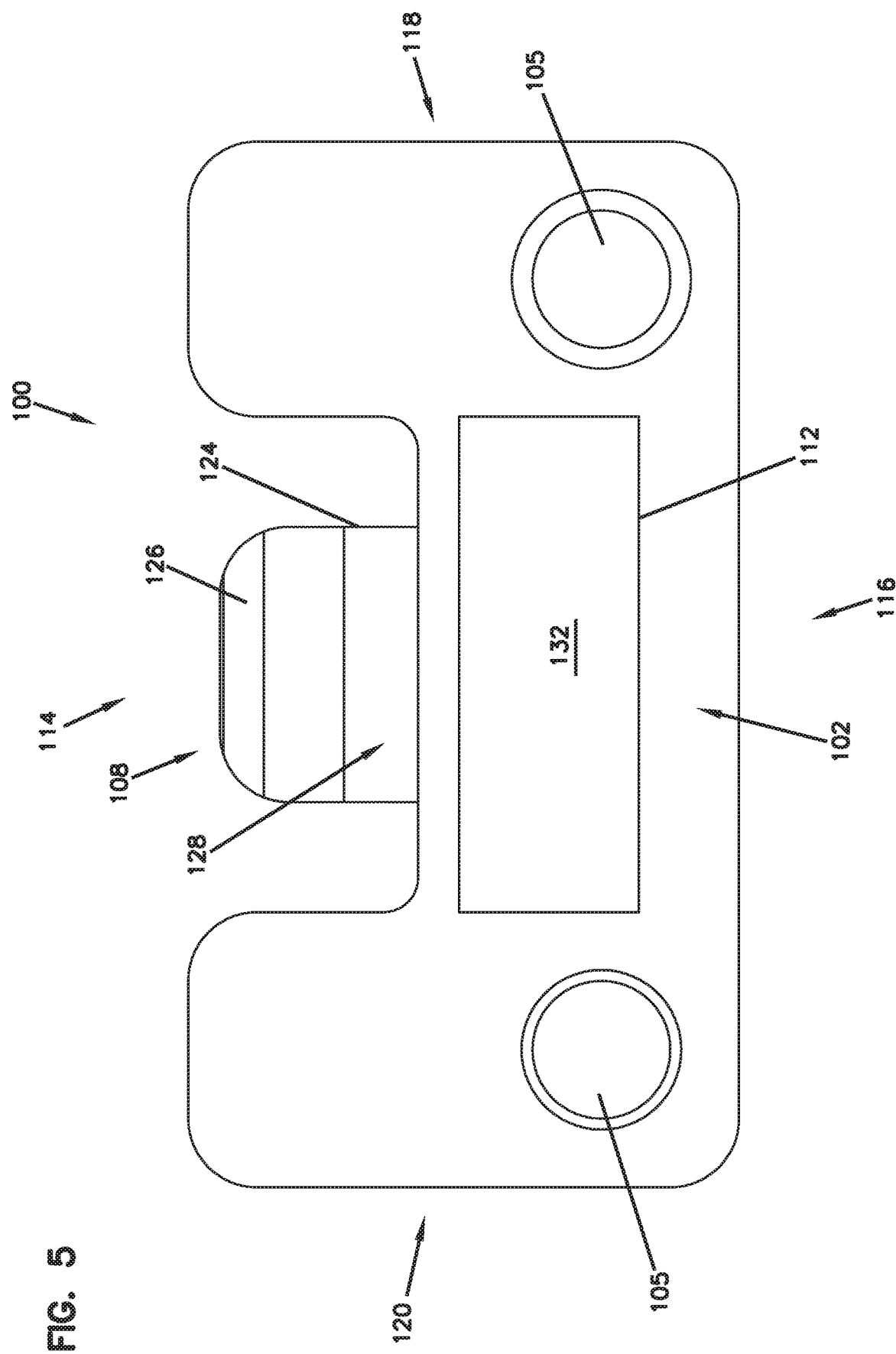
FIG. 5 illustrates a bottom view of the optical fiber retaining clip of FIG. 2.

FIG. 4 shows a bottom perspective view of the clip 100, and FIG. 5 shows a bottom elevation view of the clip 100. The recesses 105 are shown disposed within the main body 102 of the clip 100. Specifically, the recesses 105 are aligned within the projections 104 of the clip 100. Because the recesses 105 are aligned and disposed within the projections 104, other similar clips 100 with a similar construction can be mated with the clip 100 so as to allow an interference fit between the projections 104 of one clip 100 and the recesses 105 of another clip 100. In some embodiments, the recesses 105 can have a sloped opening 130. In some embodiments, each recess 105 can have a different sloped opening with a different slope.

In some embodiments, the bottom side 112 of the clip 100 can also include a mounting structure 132. In some embodiments, the mounting structure 132 is a magnet. In other embodiments, the mounting structure 132 is adhesive tape. The mounting structure 132 can be used to mount the clip 100 to a surface to aid in organization.

Figure 6:
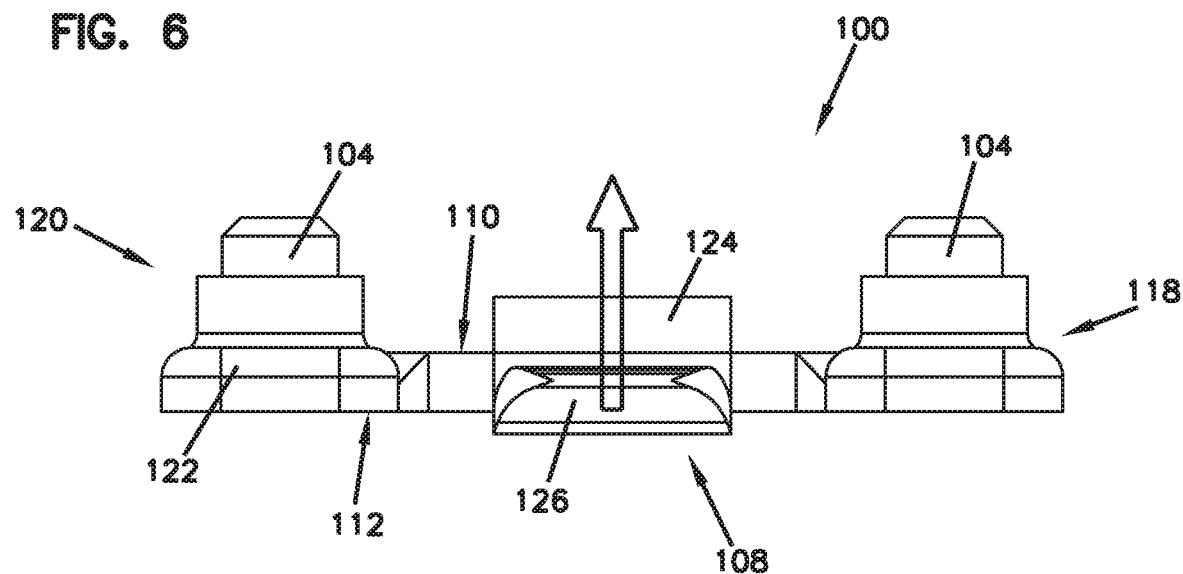
FIG. 6 illustrates a front view of the optical fiber retaining clip of FIG. 2.

FIG. 6 shows a front elevation view of the clip 100. To disengage the compression force of the flexible tab 108 and release the optical fiber cables 101 from the flexible tab 108, the lever arm 126 can be moved in a direction upward away from the top 110 of the main body 102, as shown by an arrow in FIG. 6. The flexible tab 108 is configured to be moved in an upward direction to either receive or release the optical fiber cables 101 into or out of the passage 128. Once the tab is released, it returns to its closed, or compressed, position as shown in FIG. 6.

Figure 7:
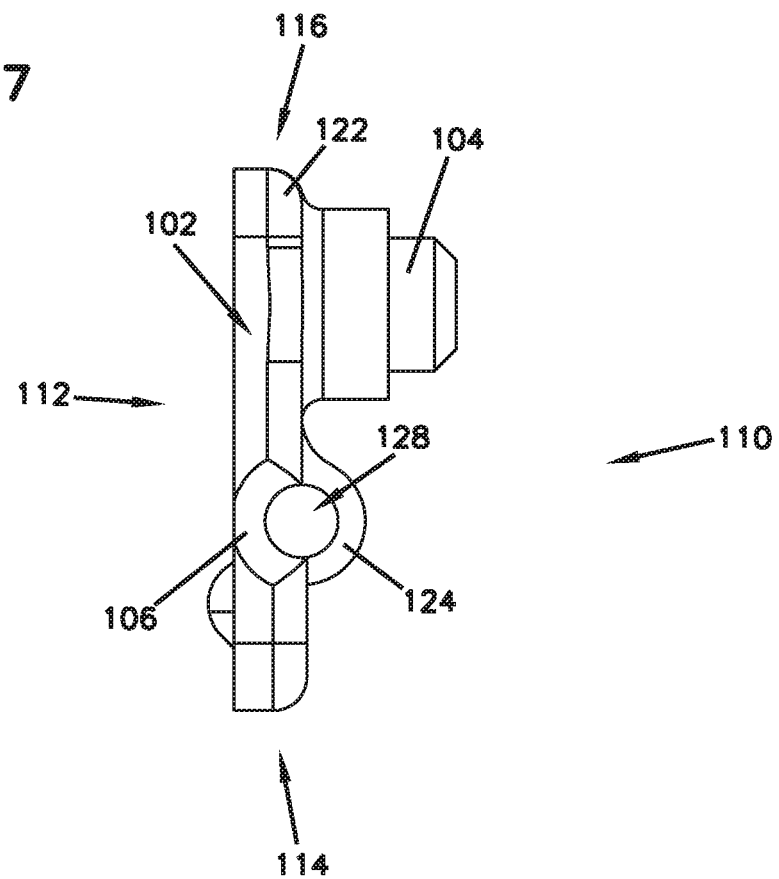
FIG. 7 illustrates a right side view of the optical fiber retaining clip of FIG. 2.

FIG. 7 shows a right side elevation view of the clip 100. As shown, the passage 128 of the flexible tab 108 is aligned with the channel 106 of the main body 102. Such alignment creates a path for the optical fiber cables 101 to travel along the main body 102 when the clip 100 is secured to a cable group 107. Further, the channel 106 and passageway 128 aid in preventing the optical fiber cables 101 from bending or kinking and potential damage while simultaneously retaining them.

Figure 8:
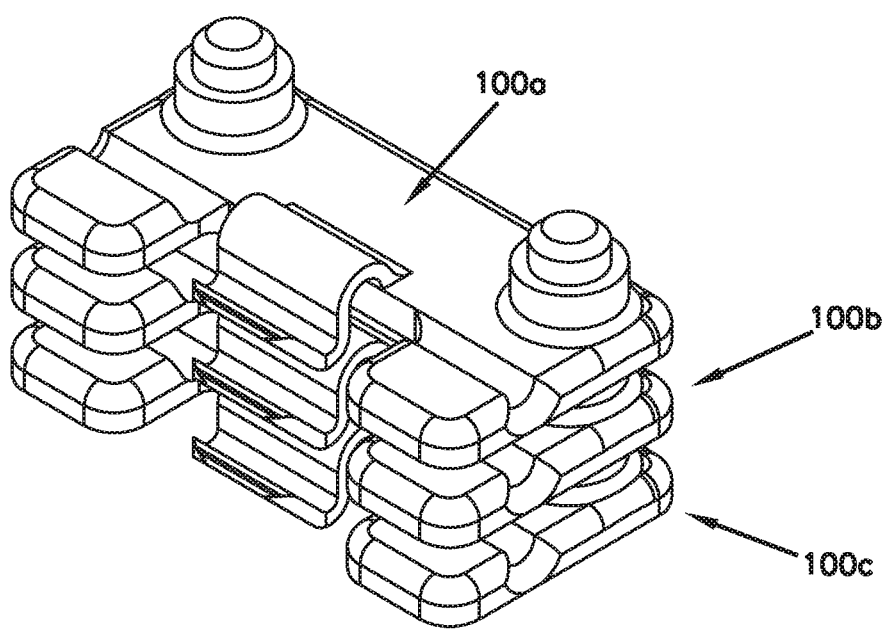
FIG. 8 illustrates a perspective view of a plurality of the optical fiber retaining clips of FIG. 2 in a stacked configuration.
Figure 9:
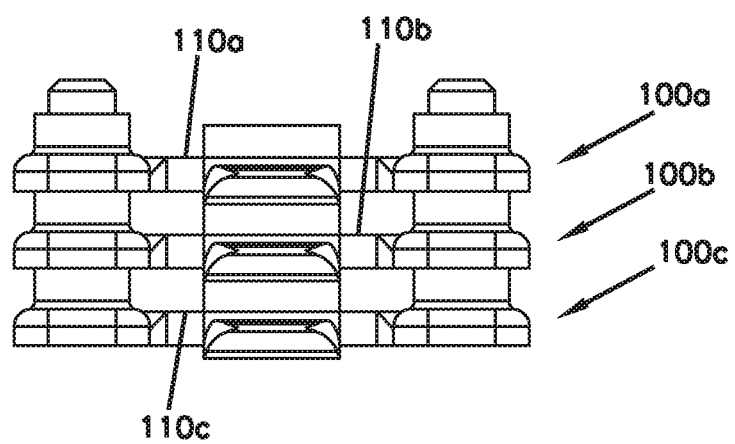
FIG. 9 illustrates a front view of a plurality of the optical fiber retaining clips of FIG. 2 in a stacked configuration.
Figure 10:
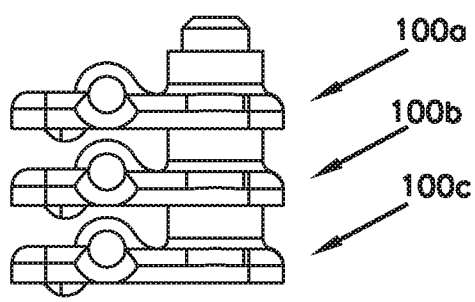
FIG. 10 illustrates a left side view of a plurality of the optical fiber retaining clips of FIG. 2 in a stacked configuration.
Figure 11:
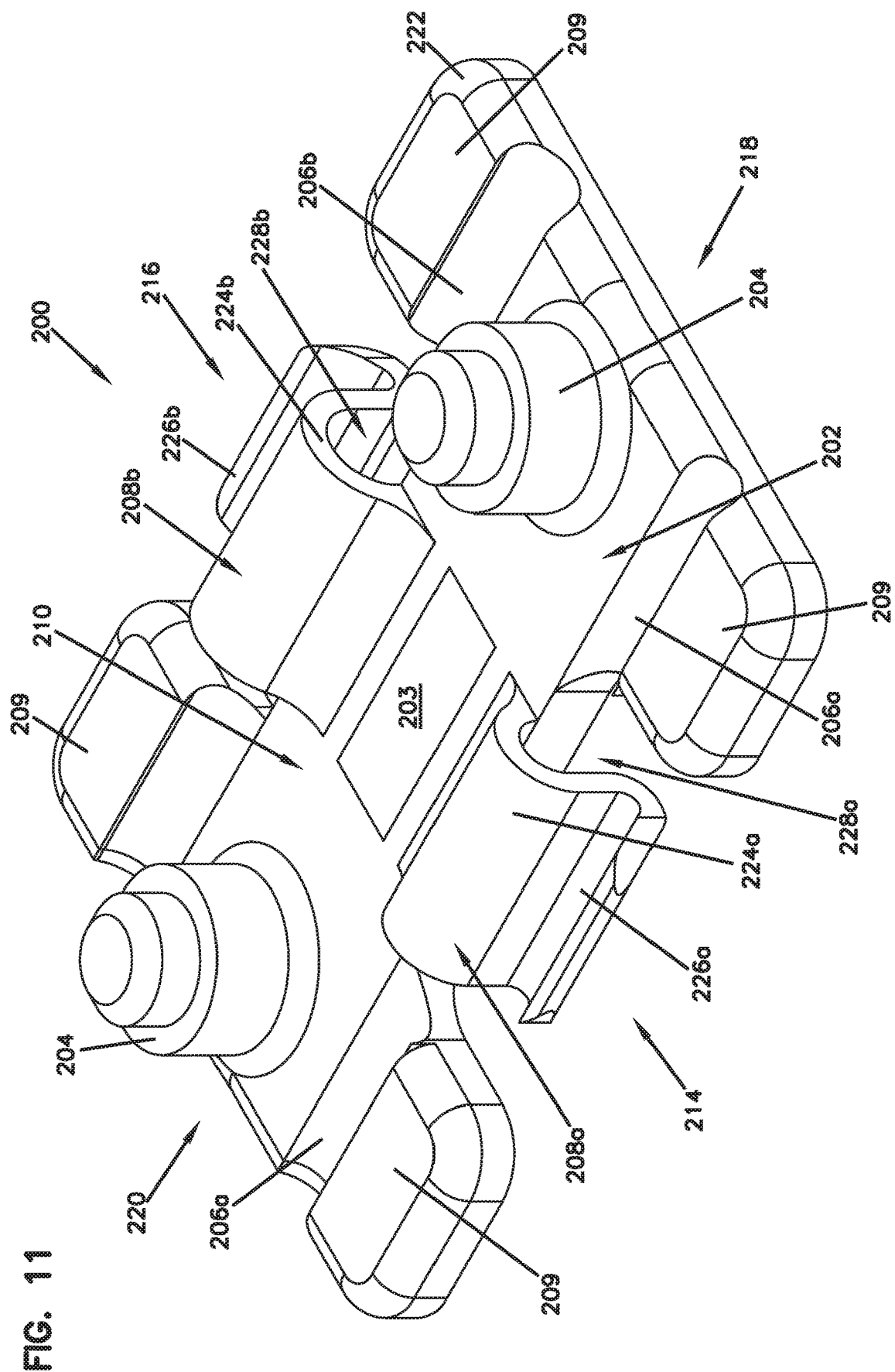
FIG. 11 illustrates a top perspective view of a single optical fiber retaining clip, according to one embodiment of the present disclosure
Figure 12:
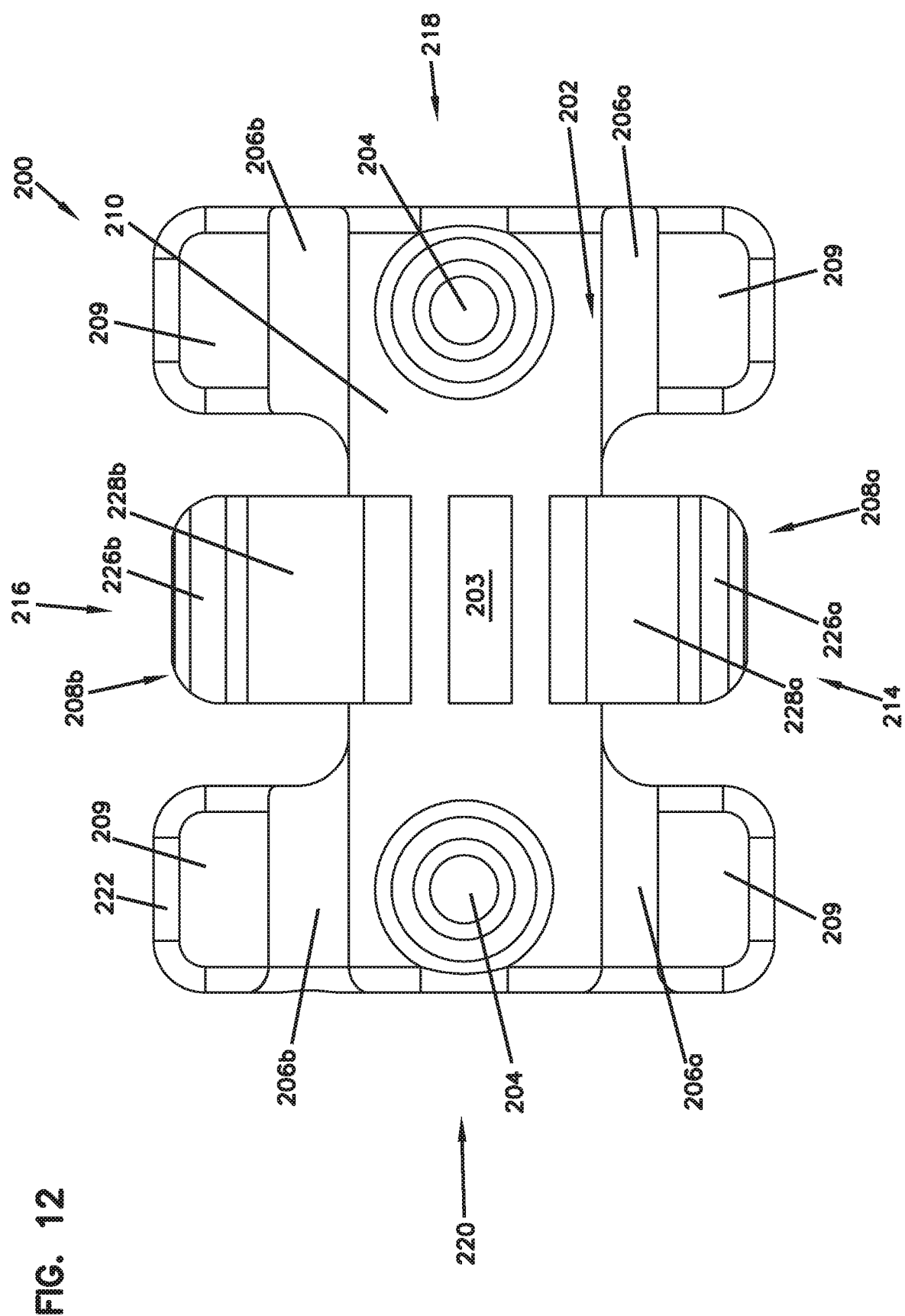
FIG. 12 illustrates a top view of the optical fiber retaining clip of FIG. 11.
Figure 13:
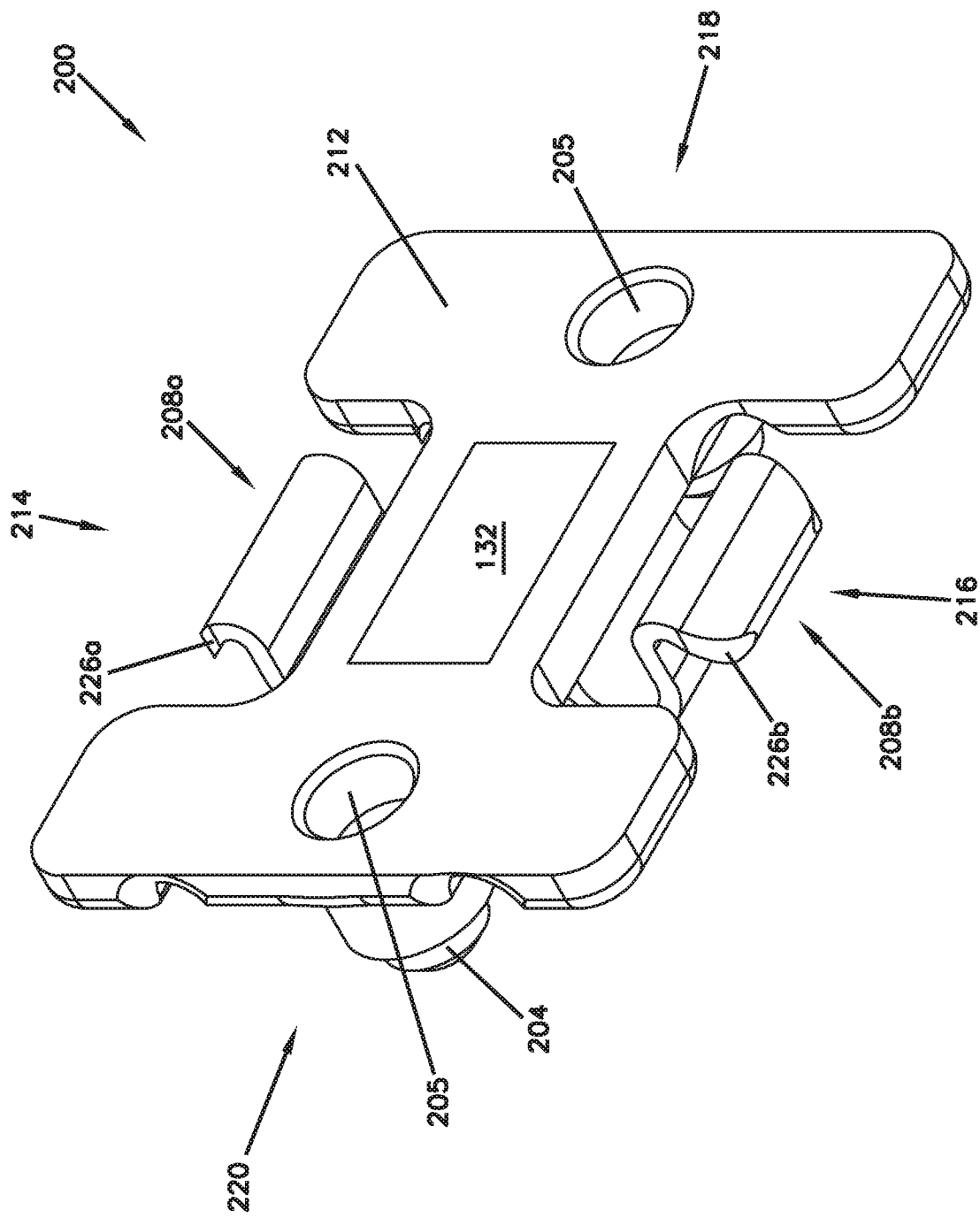
FIG. 13 illustrates a bottom perspective view of the optical fiber retaining clip of FIG. 11.
Figure 14:
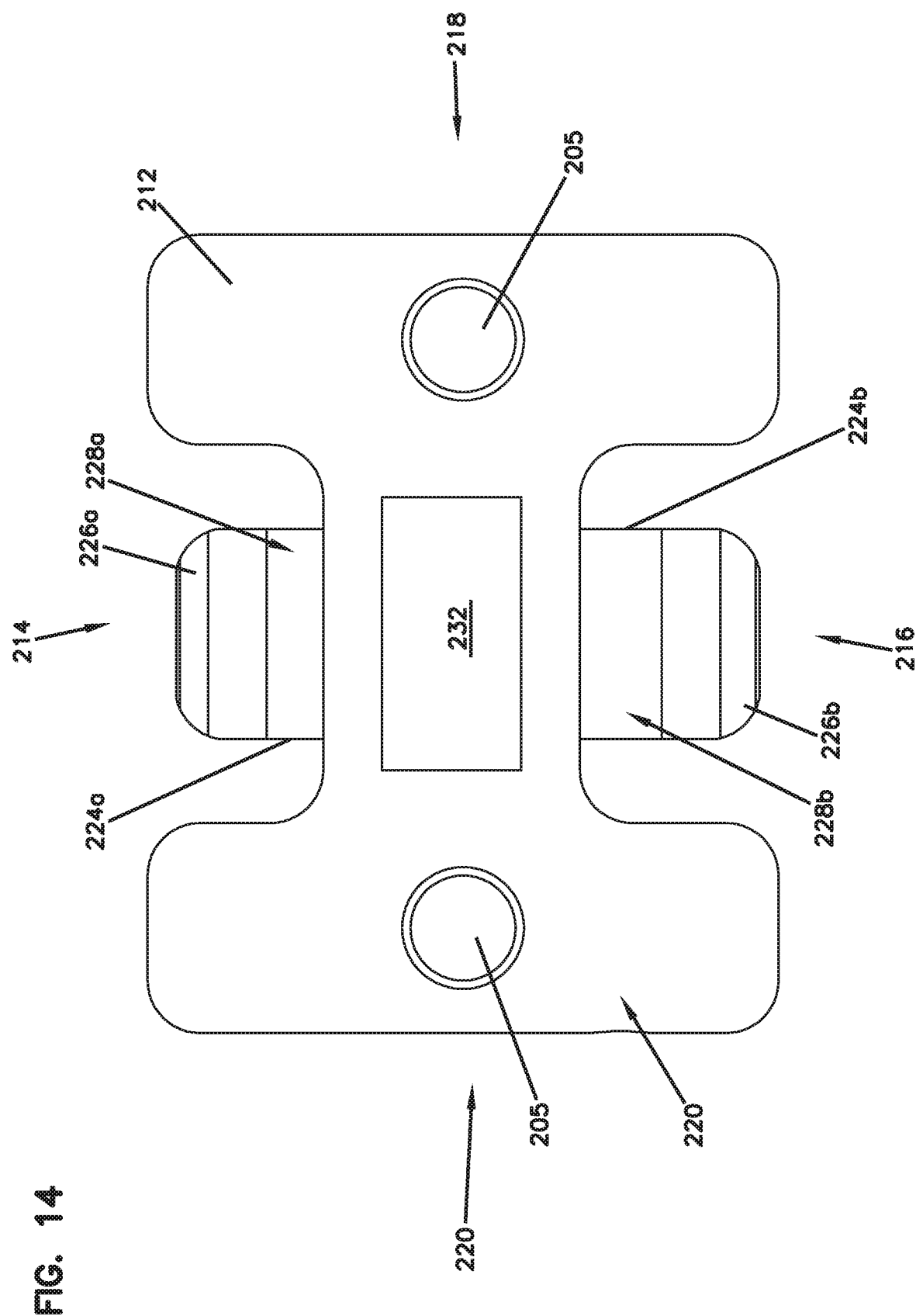
FIG. 14 illustrates a bottom view of the optical fiber retaining clip of FIG. 11.
Figure 15:
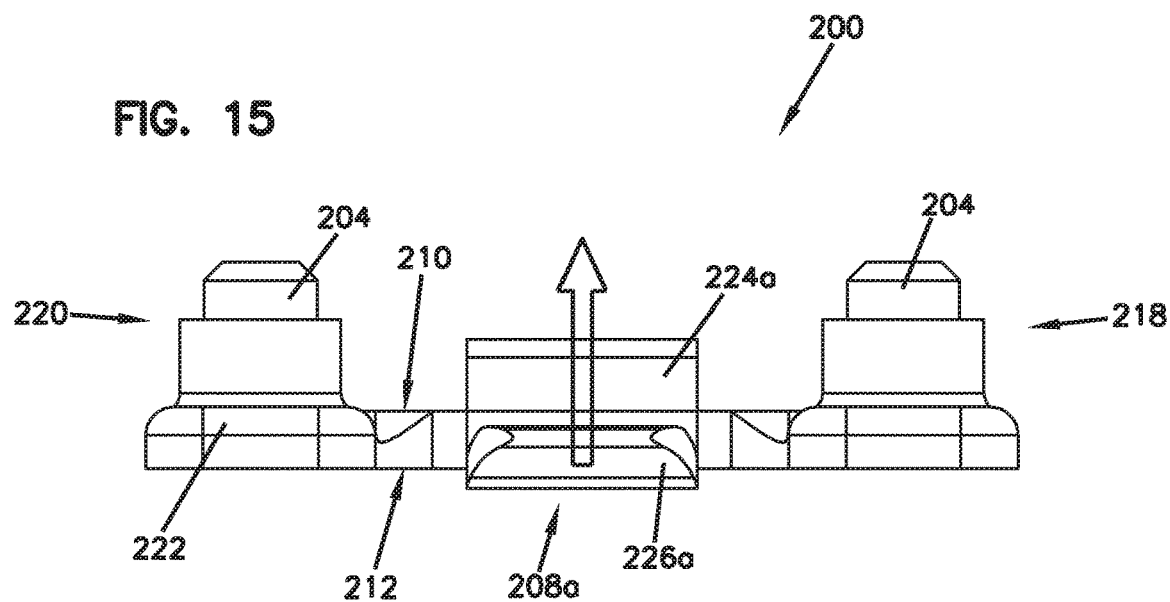
FIG. 15 illustrates a front view of the optical fiber retaining clip of FIG. 11.

FIGS. 8-10 show three clips 100a, 100b, 100c secured together. As shown, the clips 100a, 100b, 100c are aligned to face the same direction; however, in some embodiments, the clips 100a, 100b, 100c can be flipped to face opposite directions from one another. As shown in FIG. 9, space exists between the top surfaces 110a, 110b, 110c of each clip 100a, 100b, 100c when they are stacked together. The clips 100a, 100b, 100c can be readily removed from each other; however, they remain attached to one another during handling. Further, additional clips 100 can be added to the stack, in some embodiments, the stack only includes two clips. Further, not all clips need be identical. So long as each clip 100 includes similar projections 104 and recesses 105, the configuration of the clip 100 itself can vary widely and still be considered within the scope of the present disclosure.

FIGS. 11-19 show a clip 200 according to one embodiment of the present disclosure. The clip 200 shares many similar features with the clip 100 described above. As such, the clip 200 includes a main body 202; an optional label 203; a pair of projections 204; a pair of recesses 205; a pair of fiber channels 206a, 206b; a pair of flexible tabs 208a, 208b; and a rounded edge 222. The main body 202 includes a top 210, bottom, 212, front 214, back 216, left 218, and right 220. Further, the flexible tabs 208a, 208b each include an arced portion 224a, 224b; a lever arm 226a, 226b; and a passage 228a, 228b. In some embodiments, the bottom side 212 of the clip 200 can also include a mounting structure 232 that is substantially similar to the mounting structure 132 described above.

As shown, the main difference with the clip 200, as compared to clip 100, is that clip 200 includes an additional fiber channel 206b and an additional flexible tab 208b. This allows the clip 200 to manage and organize two separate groups 107 of optical fiber cables 101. Further, the main body 202 includes a plurality of arms 209 extending therefrom.

Figure 16:
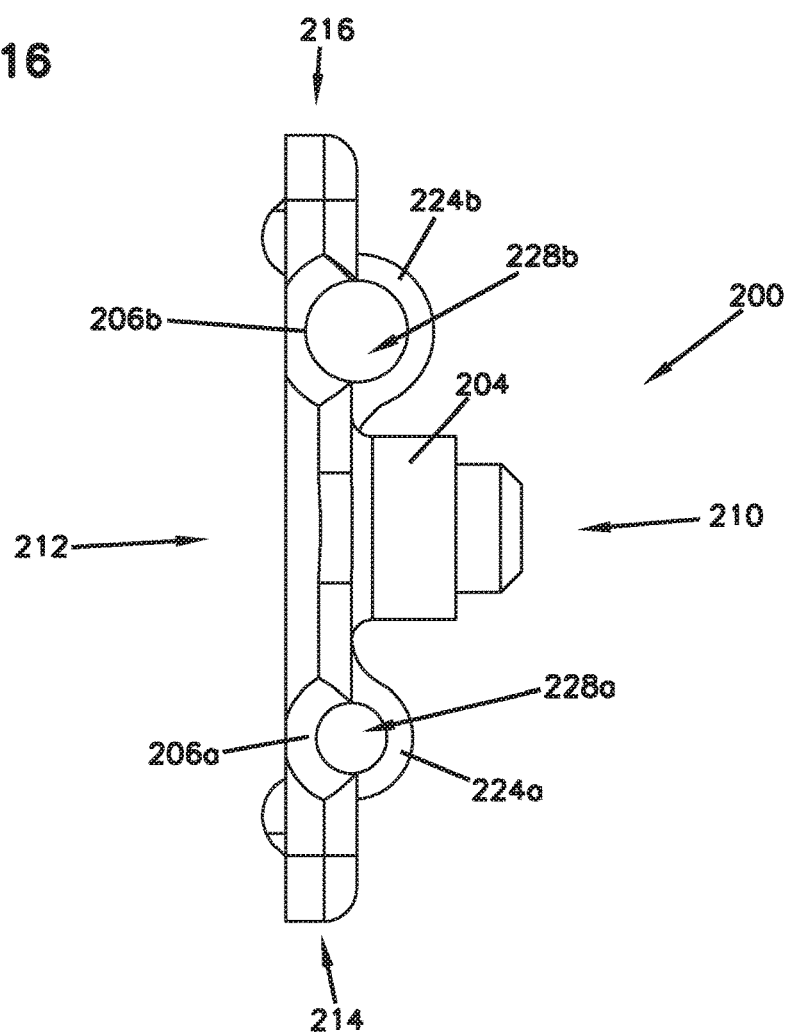
FIG. 16 illustrates a right side view of the optical fiber retaining clip of FIG. 11.

FIG. 16 shows a right side elevation view of the clip 200. In some embodiments the flexible tab 208a paired with the fiber channel 206a is configured to hold a different amount of optical fiber cables 101 than the other flexible tab 208b and fiber channel 206b. As shown in FIG. 16, the passage 228b and channel 206b are both larger than the passage 228a and channel 206a.

Figure 17:
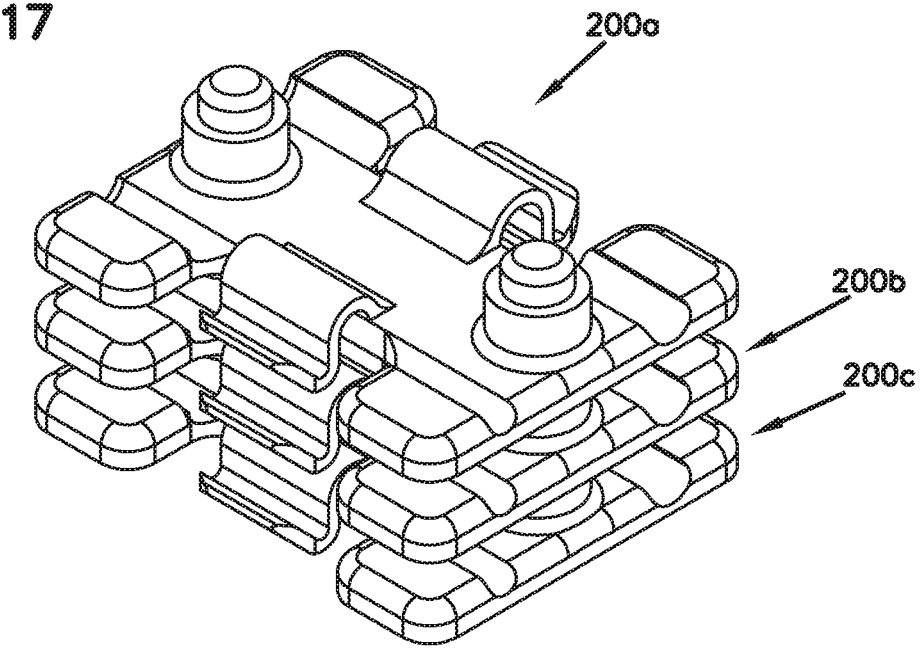
FIG. 17 illustrates a perspective view of a plurality of the optical fiber retaining clips of FIG. 11 in a stacked configuration.
Figure 18:
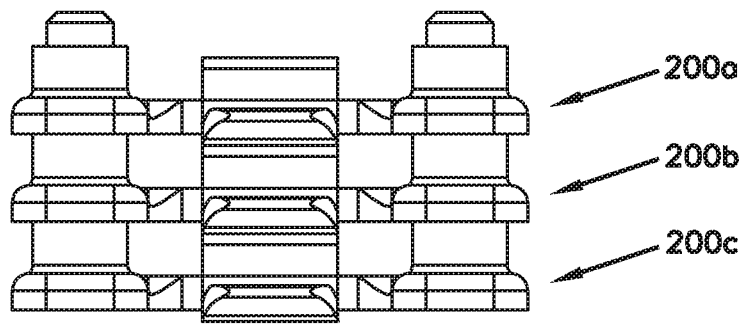
FIG. 18 illustrates a front view of a plurality of the optical fiber retaining clips of FIG. 11 in a stacked configuration.
Figure 19:
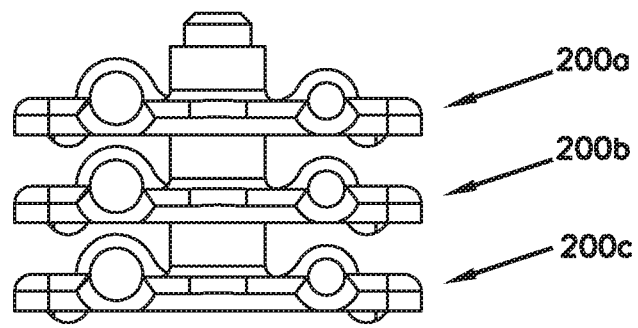
FIG. 19 illustrates a left side view of a plurality of the optical fiber retaining clips of FIG. 2 in a stacked configuration.
Figure 20:
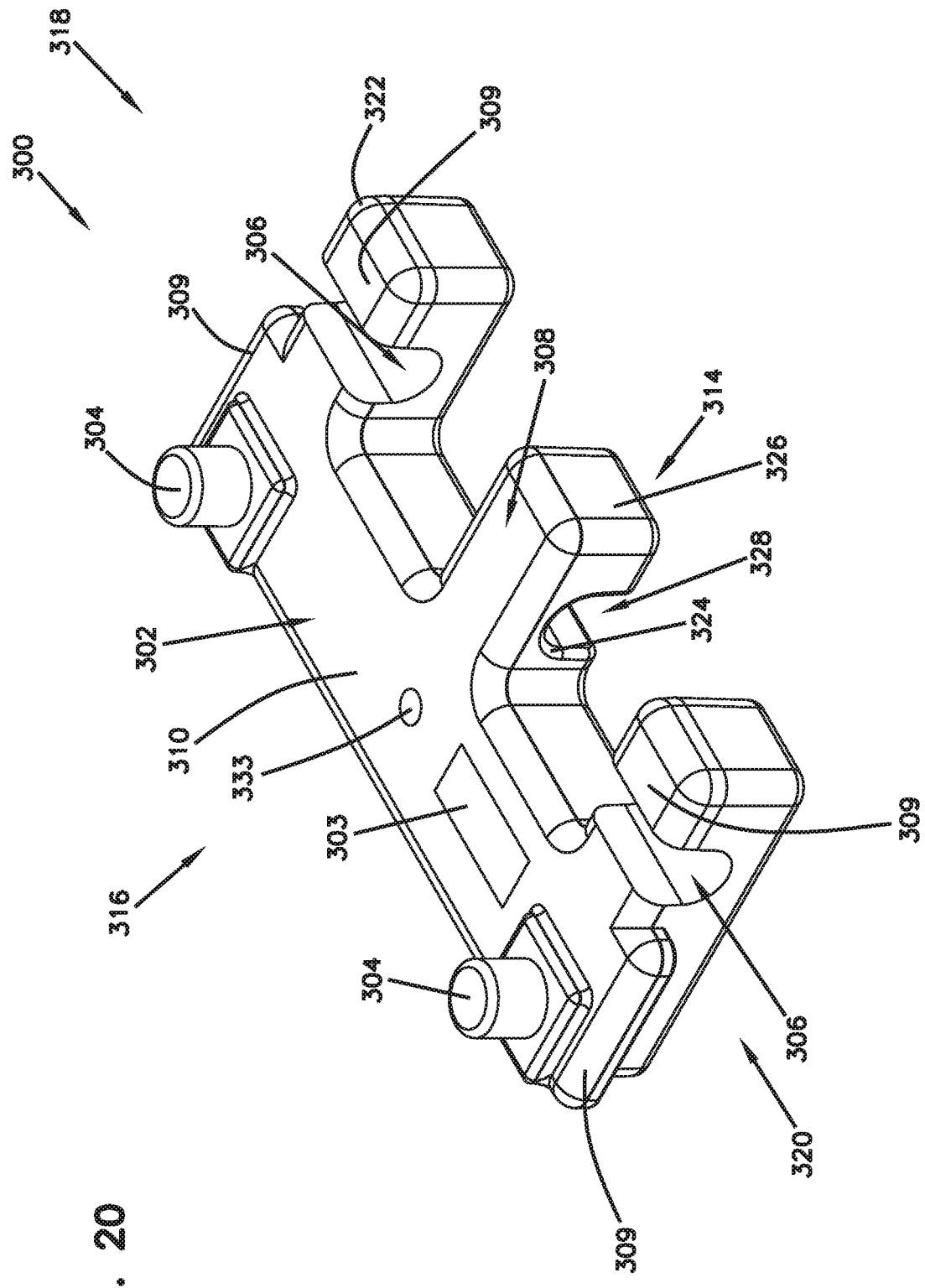
FIG. 20 illustrates a top perspective view of a single optical fiber retaining clip, according to one embodiment of the present disclosure.
Figure 21:
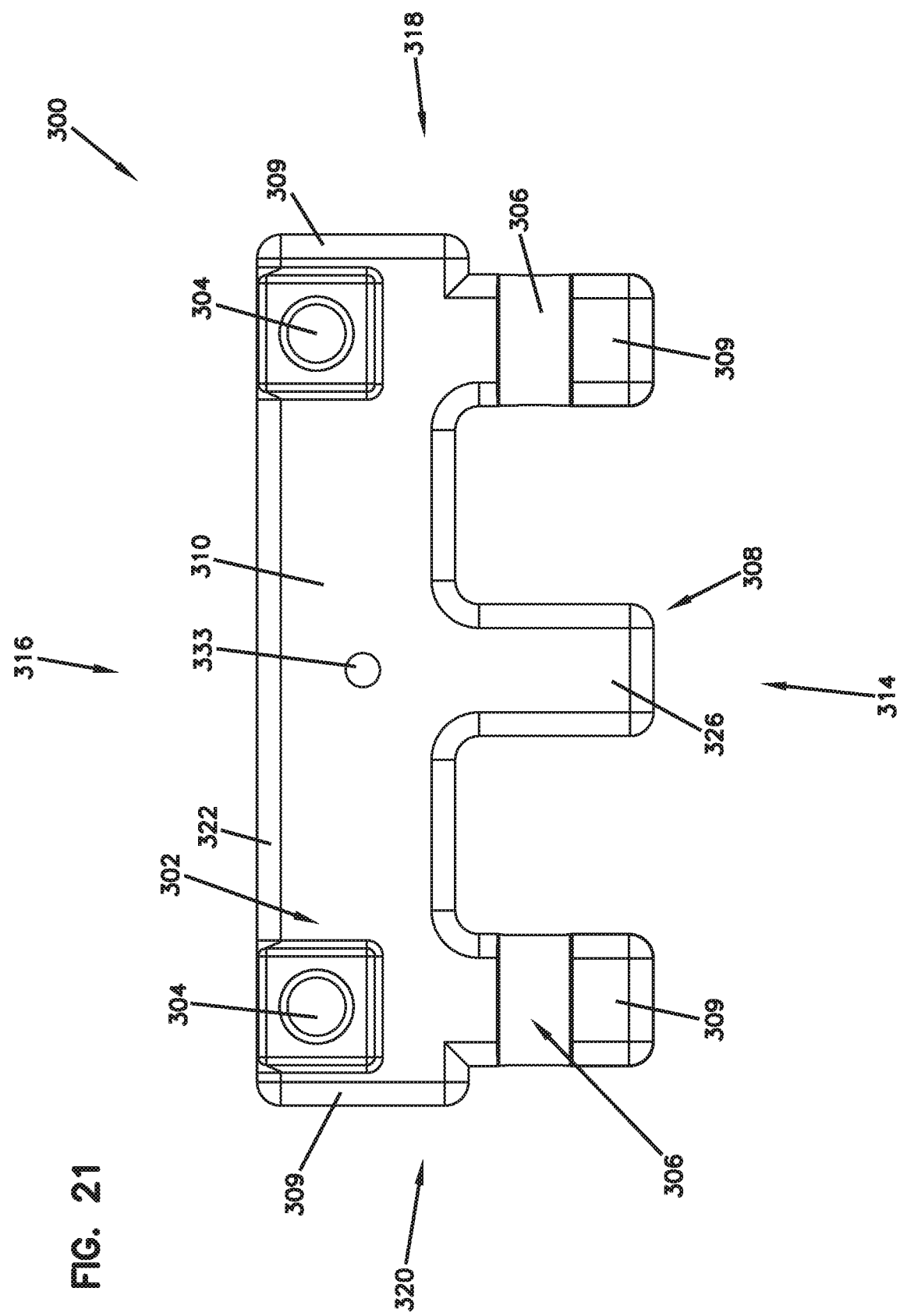
FIG. 21 illustrates a top view of the optical fiber retaining clip of FIG. 20.
Figure 22:
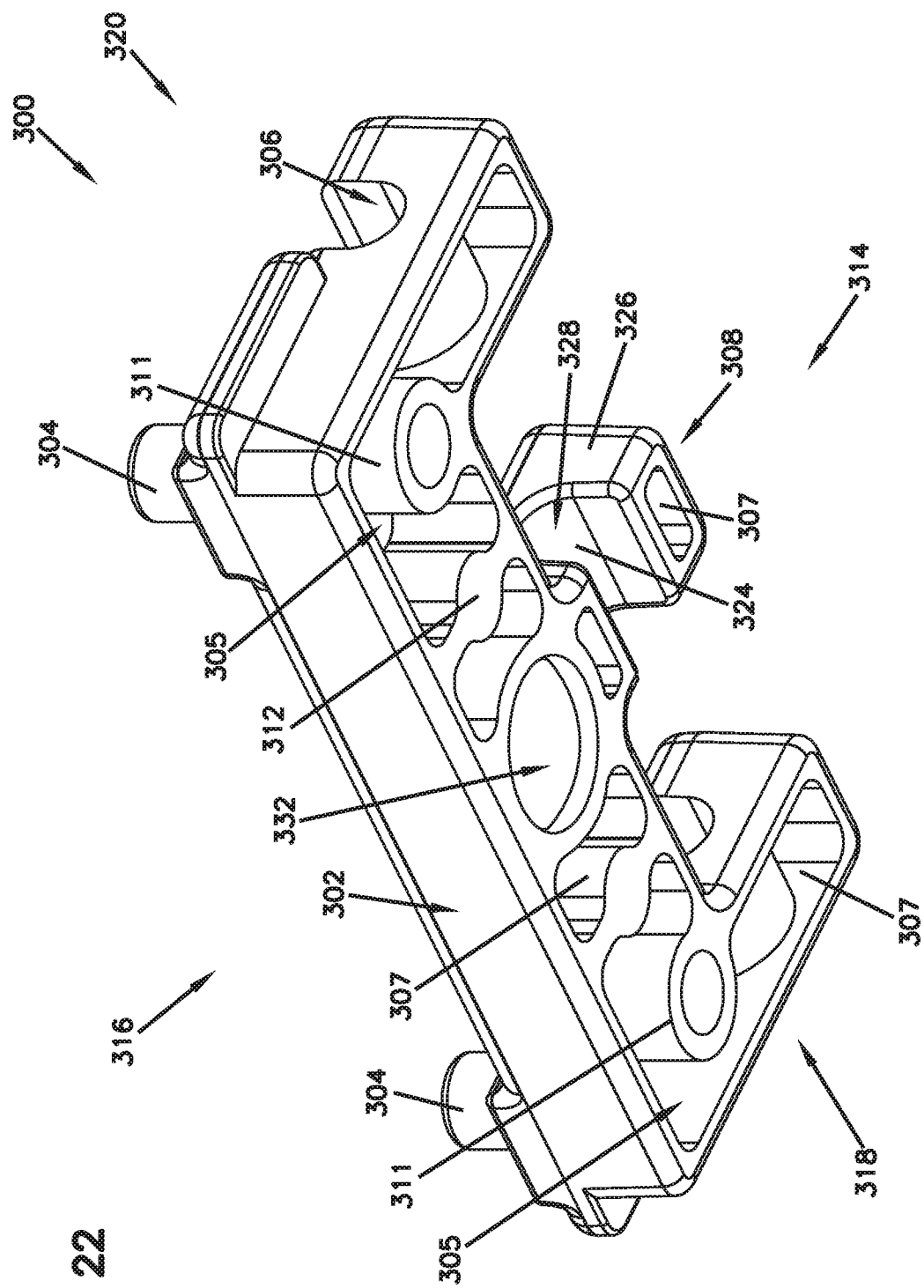
FIG. 22 illustrates a bottom perspective view of the optical fiber retaining clip of FIG. 20.
Figure 23:
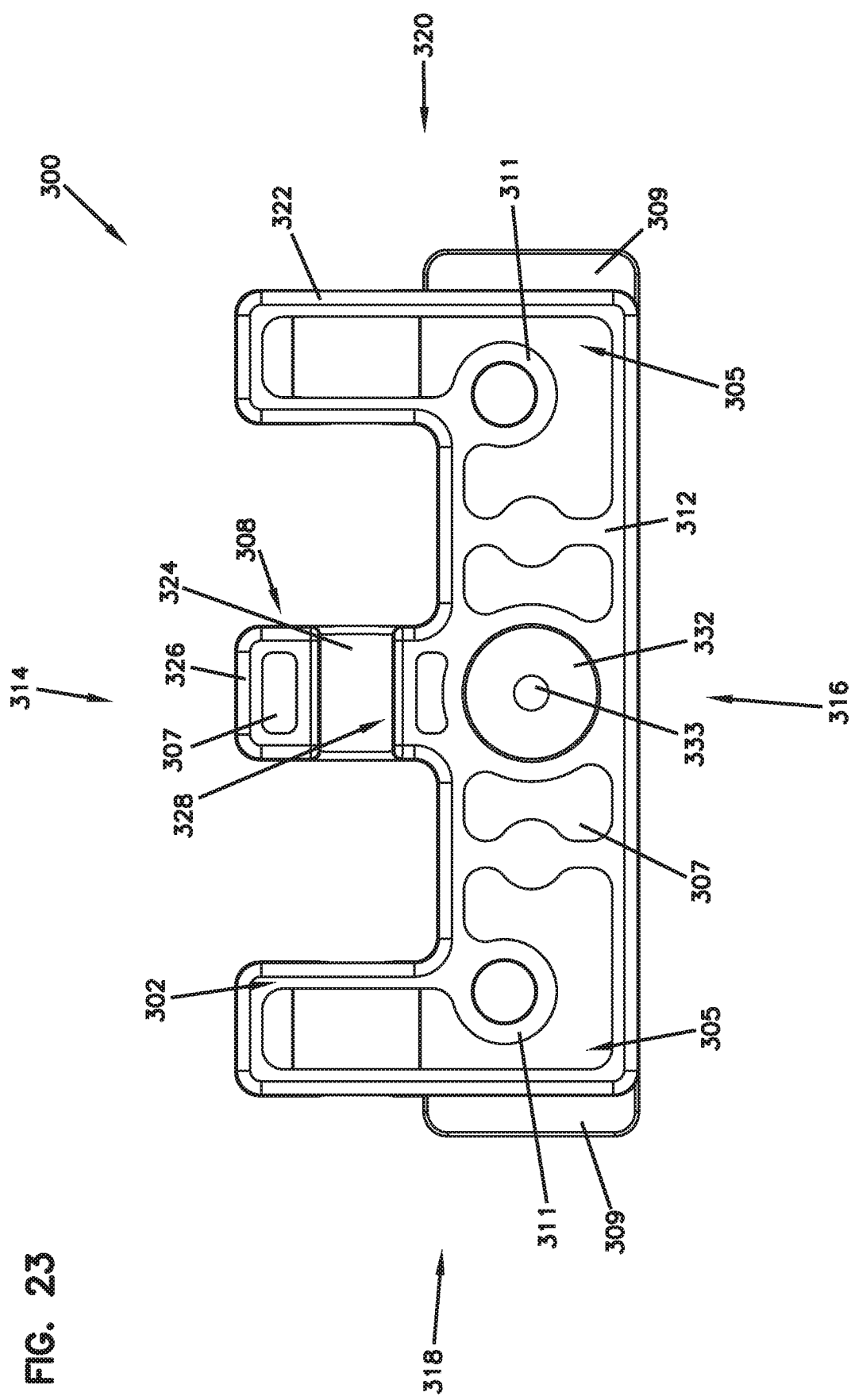
FIG. 23 illustrates a bottom view of the optical fiber retaining clip of FIG. 20.

FIGS. 17-19 shows three clips 200a, 200b, 200c secured together in similar fashion as clips 100a, 100b, and 100c described above with respect to FIGS. 7-10. Because the clip 200 includes similar projections 204 as the clip 100 described above, the clip 200 can be stacked on clip 100, or vice versa.

To install the optical fiber cable 101 on the clips 100, 200, a proper number of optical fibers should first be located by the installer. The installer then pivots the flexible tab 108, 208 of the main body 102, 202 of the clip 100, 200 in a direction away from the main body 102, 202. The installer positions the plurality of optical fiber cables under the flexible tab 108, 208 and on the top surface 110, 210 of the main body 102, 202 of the clip 100, 200. Additionally, the installer can position the plurality of optical fiber cables in the fiber channel 106, 206 disposed on the main body 102, 202. Once under the tab 108, 208, the installer releases the flexible tab 108, 208 of the main body 102, 202 of the clip 100, 200.

In some embodiments, the installer can then mate at least one projection 104, 204 extending from the main body 102, 202 of the clip 100, 200 with a matching recess 105, 205 in a main body 102, 202 of a second clip 100, 200.

FIGS. 20-25 show a clip 300 according to one embodiment of the present disclosure. The clip 300 shares many similar features with the clips 100, 200 described above. As such, the clip 300 includes a main body 302, an optional label 303, a pair of projections 304, projection receiving recesses 305, a fiber channel 306, a flexible tab 308, a rounded edge 322, a mounting structure recess 332, and a pair of wings 309. The main body 302 includes a top 310, bottom 312, front 314, back 316, left 318, and right 320. Further, the flexible tab 308 includes an arced portion 324, a lever arm 326, and a passage 328. The clip 300 is manufactured from a flexible elastomer so as to allow the clip 300 to be flexible. The tab 308 can deform so as to allow a fiber cable 101 to be inserted and held in the channel 306. Further, the main body 302 includes a plurality of arms 309 extending therefrom.

The projection receiving recesses 305 of the clip 300 are shaped and configured to receive and hold the projections 304. However, the bottom 312 of the clip 300 includes a plurality of recesses 307 so as to help reduce the amount of material required to manufacture the clip. The clip 300 includes flexible walls 311 positioned adjacent the projection receiving recesses 305. The flexible walls 311 are configured to deform when the projection receiving recesses 305 receive projections 304 of an additional clip. The flexible walls 311 help to retain the projections within the projection receiving recesses 305.

The mounting structure recess 332 is configured to receive a mounting structure or feature, such as a magnet, that can be used to mount the clip 300 to a surface to aid in organization. In some embodiments, the mounting structure recess 332 can include a through hole 333 so as allow for easy removal of a magnet from the mounting structure recess 332 by using a tool in the hole 333 to push out the magnet from the mounting structure recess 332.

The wings 309 of the clip 300 extend outward from the top 310 towards the left and right sides 318, 320 of the main body 302. The wings 309 are configured to act as a lever so as to allow a user to pry two attached clips 300 away from one another. In some embodiments, the clip 300 can include more than two wings 309. In other embodiments, the clip can include a single wing 309.

In some embodiments, the clip 300 can include an additional fiber channel and an additional flexible tab, similar to the clip 200 described above.

Figure 26:
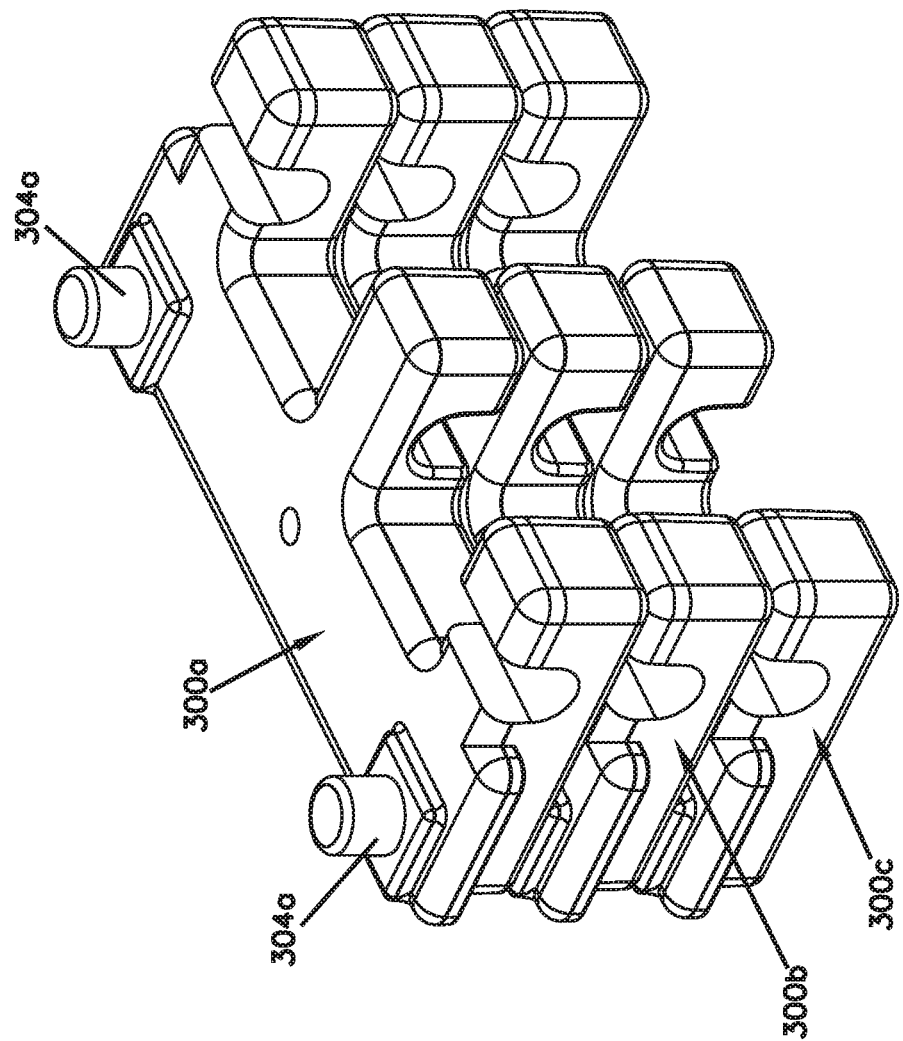
FIG. 26 illustrates a perspective view of a plurality of the optical fiber retaining clips of FIG. 20 in a stacked configuration.
Figure 27:
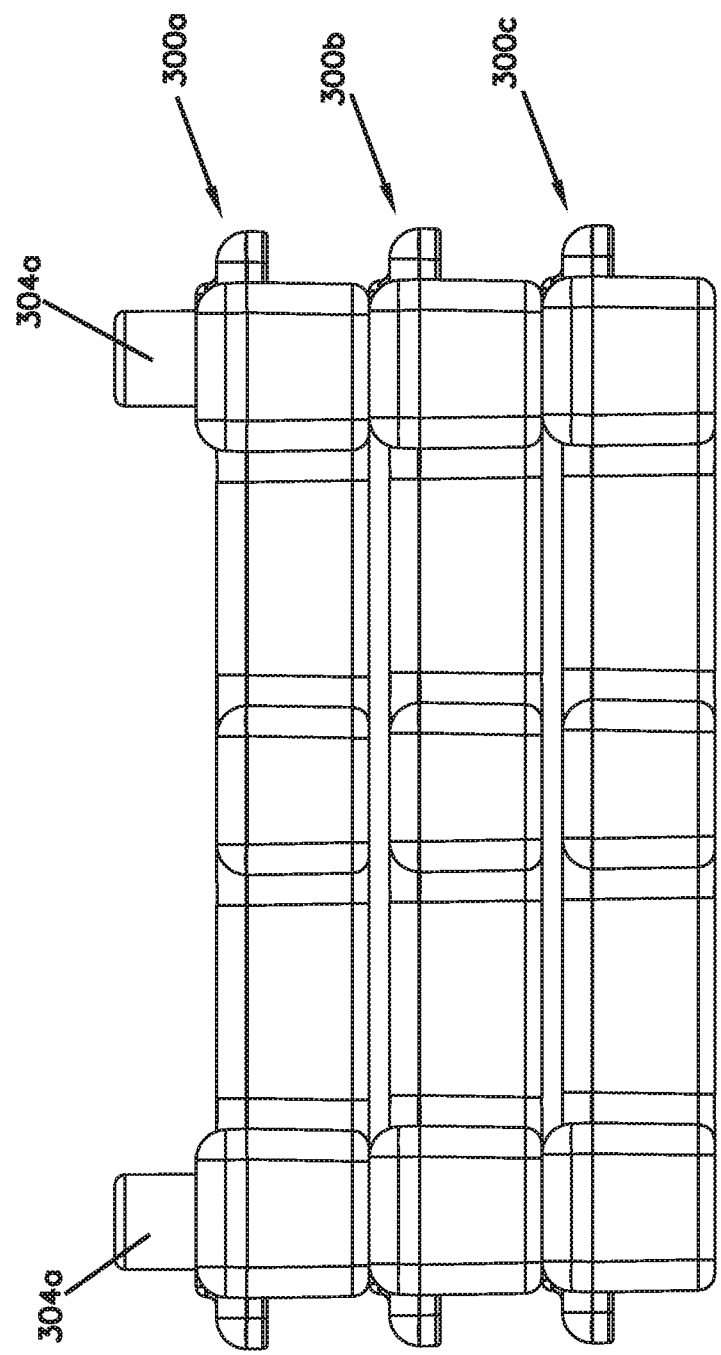
FIG. 27 illustrates a front view of a plurality of the optical fiber retaining clips of FIG. 20 in a stacked configuration.
Figure 28:
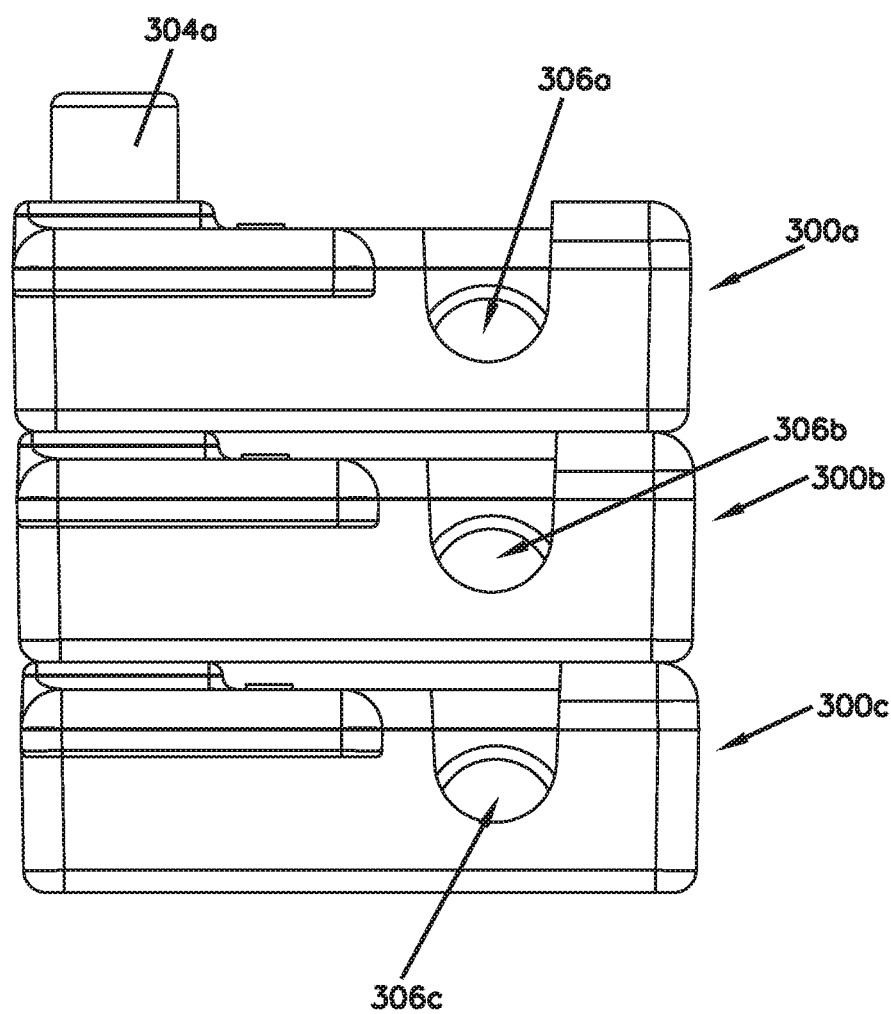
FIG. 28 illustrates a left side view of a plurality of the optical fiber retaining clips of FIG. 20 in a stacked configuration.

FIGS. 26-28 shows three clips 300a, 300b, 300c secured together in similar fashion as clips 100a, 100b, 100c and 200a, 200b, 200c described above. The projections 304 of the clip 300 are configured to mate with the projection recesses 305 of each adjacently positioned clip so as to allow the clips to be stacked and temporarily secured to one another.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. An optical fiber retaining clip comprising:
    a main body including a top face and an opposite bottom face, the main body including a pair of arms extending therefrom;
    at least one projection protruding from at least one of the top face and the bottom face, the at least one projection being configured to mate with a corresponding recess;
    a tab portion extending from the main body and positioned between the pair of arms, the tab portion being configured to hold a plurality of optical fibers to prevent relative movement between the plurality of optical fibers and the main body of the clip; and
    a channel being at least partially defined by channel portions of the arms and at least partially defined by a channel portion of the tab portion, wherein the channel portions of the arms face in an opposite direction to the channel portion of the tab portion, and wherein the channel is configured to receive the plurality of optical fibers;
    wherein the at least one projection extends in a first direction relative to the main body;
    wherein the arms and tab portions extend in a second direction relative to the main body, the second direction being perpendicular to the first direction;
    wherein the channel portions of the arms are defined by recesses in the top face of the main body, the channel portions extending across both the arms and the tab portion, and the channel portions extending perpendicular to the second direction.

2. The optical fiber retaining clip of claim 1, wherein the tab portion includes a lever arm and an arced portion.

3. The optical fiber retaining clip of claim 1, further comprising at least one recess disposed in the bottom face of the main body.

4. The optical fiber retaining clip of claim 1, further comprising a label surface disposed on the main body.

5. The optical fiber retaining clip of claim 1, further comprising a mounting structure disposed at the bottom face of the main body, the mounting structure being configured to secure the clip to an external surface.

6. The optical fiber retaining clip of claim 5, wherein the mounting structure is a magnet.

7. The optical fiber retaining clip of claim 5, wherein the mounting structure is received by a recess in the bottom face of the main body.

8. The optical fiber retaining clip of claim 1, wherein the tab portion is a first tab portion, and wherein the optical fiber retaining clip further comprises a second tab portion extending from the main body, the second tab portion being configured to hold a second group of optical fibers to prevent relative movement between the second group of optical fibers and the main body of the clip, wherein each tab portion includes a lever arm and an arced portion, and wherein each of the first and second tab portions define an optical fiber passageway.

9. The optical fiber retaining clip of claim 8, wherein the channel is a first channel, and wherein the optical fiber retaining clip further comprises a second channel being disposed on the main body, the first channel being aligned with the first optical fiber passageway and the second channel being aligned with the second optical fiber passageway, each channel being configured to receive a plurality of optical fibers.

10. The optical fiber retaining clip of claim 1, wherein the optical fiber retaining clip is constructed of an elastomer.

11. The optical fiber retaining clip of claim 1, wherein the main body includes at least one wing extending from a side thereof.

12. The optical fiber retaining clip of claim 1, wherein the tab portion is a flexible tab portion.

13. An optical fiber clipping system comprising:
    a first clip including:
        a tab portion for retaining a plurality of optical fibers;
        at least one projection protruding from at least one of a top face and an opposite bottom face of the first clip, the at least one projection being configured to mate with a corresponding recess; and
        a first clip channel being at least partially defined by channel portions of a pair of arms and at least partially defined by a channel portion of the tab portion, wherein the tab portion is positioned between the pair of arms, wherein the channel portions of the arms face in an opposite direction to the channel portion of the tab portion, and wherein the first clip channel is configured to receive the plurality of optical fibers; and
    a second clip including:
        a tab portion for retaining a plurality of optical fibers; and
        at least one recess portion for receiving the at least one projection from the first clip;
    wherein the at least one projection extends in a first direction relative to the first clip;
    wherein the pair of arms and the tab portion of the first clip extend in a second direction relative to the first clip, the second direction being perpendicular to the first direction; and wherein the channel portions of the pair of arms are defined by recesses in the top face of the first clip, the channel portions extending across both the arms and the tab portion of the first clip, and the channel portions extending perpendicular to the second direction.

14. The optical fiber clipping system of claim 13, wherein each tab portion of the first and second clips includes a lever arm and an arced portion, wherein the tab portions each define an optical fiber passageway.

15. The optical fiber clipping system of claim 13, wherein an open bottom side of the tab portion of the first clip faces in a direction toward the bottom face of the first clip.

16. The optical fiber clipping system of claim 13, wherein the first clip and the second clip each include a plurality of recesses and a plurality of projections, wherein the recesses of the first clip are configured to receive the projections of the second clip and vice versa.

17. The optical fiber clipping system of claim 13, wherein at least one of the first and second clips includes a second tab portion for retaining a second group of optical fibers.

18. The optical fiber clipping system of claim 13, wherein the tab portions are flexible tab portions.

\* \* \* \* \*